(No Model.)　　　　　　　　　　　　　　6 Sheets—Sheet 1.
F. G. DIETERICH.
GRIPPING DEVICE FOR CABLE RAILWAYS.

No. 351,501.　　　　　　　Patented Oct. 26, 1886.

Fig. I.

WITNESSES
INVENTOR (No Model.) 6 Sheets—Sheet 2.

F. G. DIETERICH.
GRIPPING DEVICE FOR CABLE RAILWAYS.

No. 351,501. Patented Oct. 26, 1886.

WITNESSES

INVENTOR
Fred G. Dieterich (No Model.) 6 Sheets—Sheet 3.

F. G. DIETERICH.
GRIPPING DEVICE FOR CABLE RAILWAYS.

No. 351,501. Patented Oct. 26, 1886.

WITNESSES
H. B. Brown
Colon C. Hemon

INVENTOR
Fred G. Dieterich

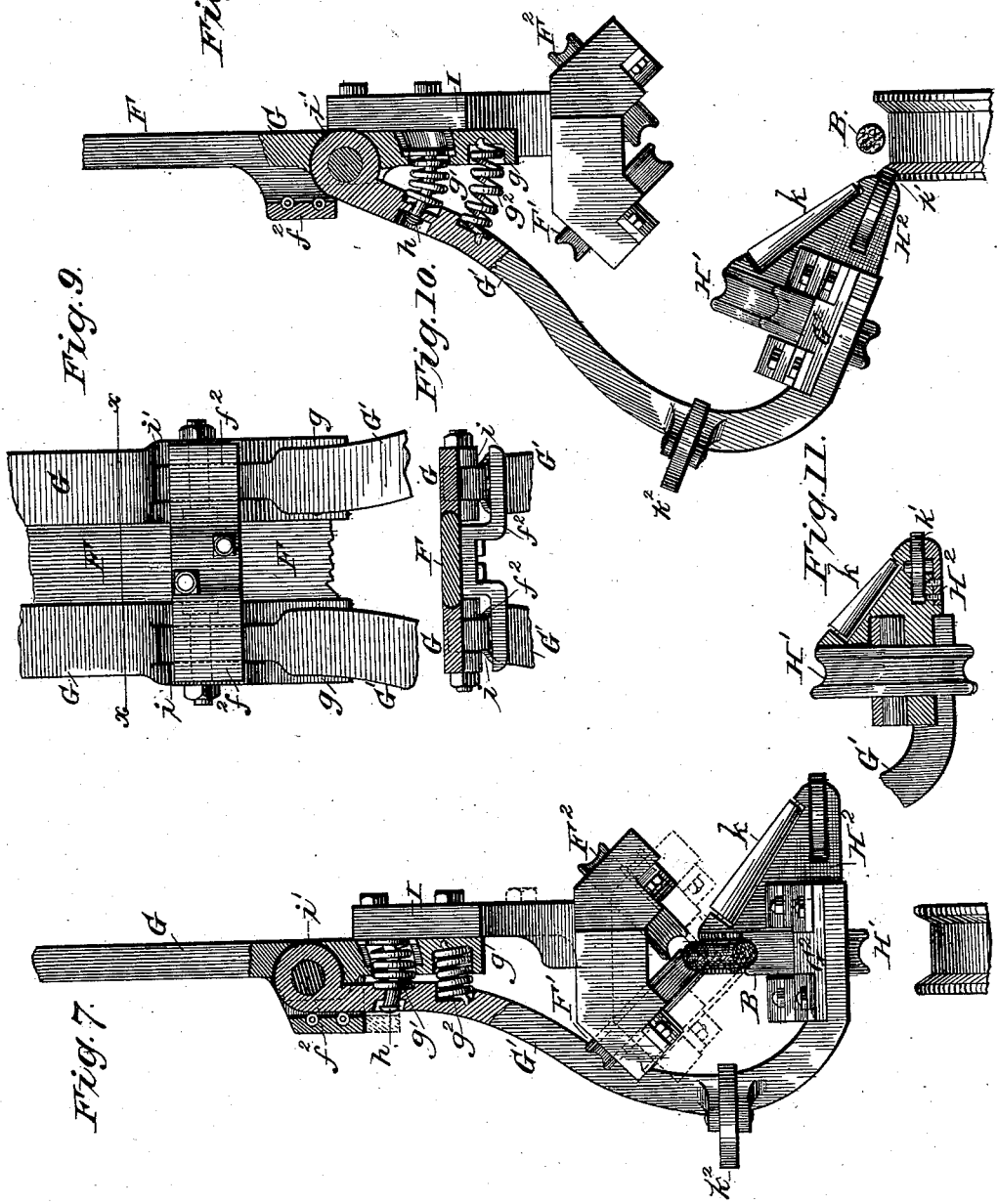

(No Model.) 6 Sheets—Sheet 5.
F. G. DIETERICH.
GRIPPING DEVICE FOR CABLE RAILWAYS.
No. 351,501. Patented Oct. 26, 1886.
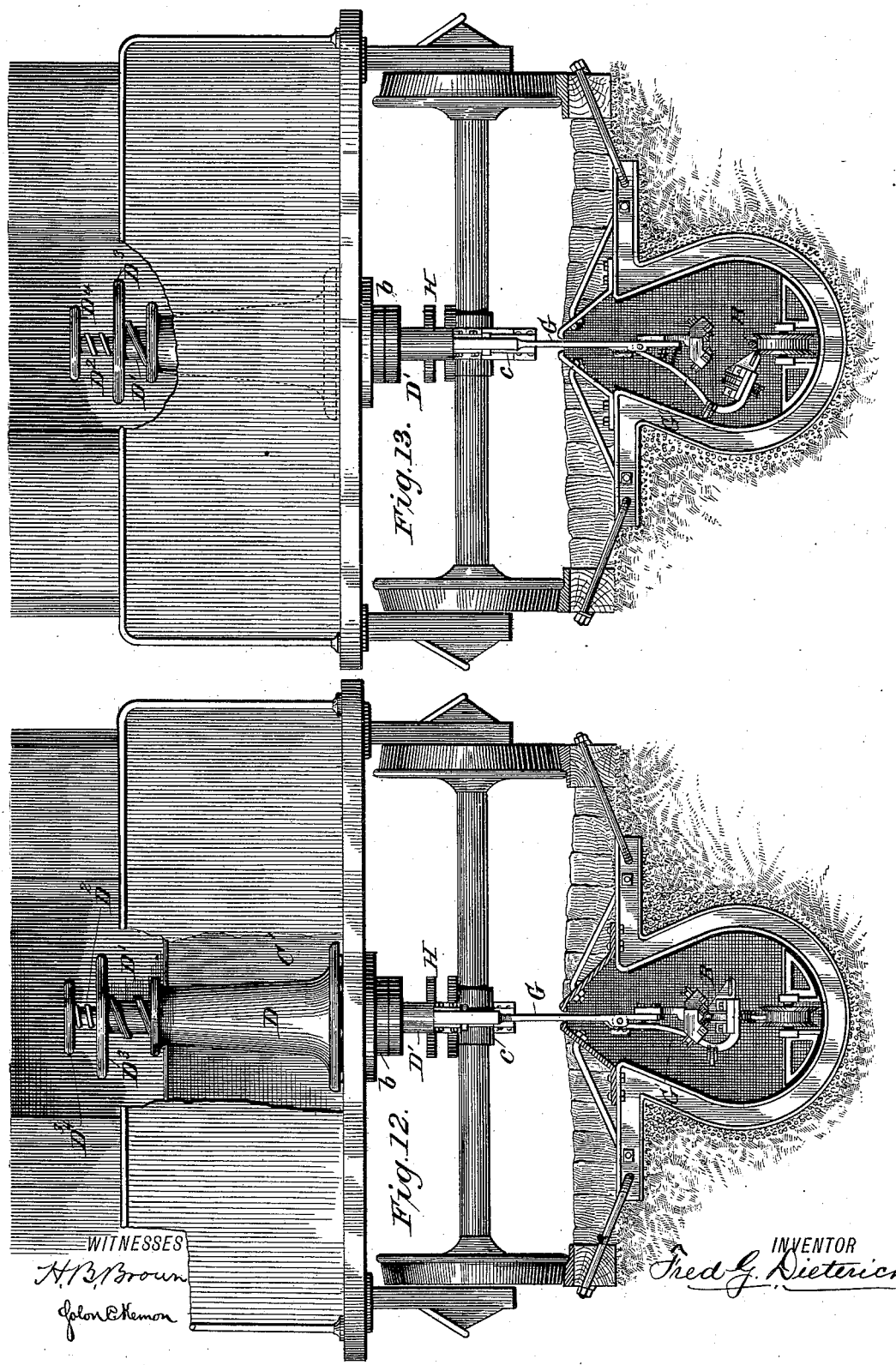
WITNESSES
H. B. Brown
Solon E. Kemon
INVENTOR
Fred G. Dieterich (No Model.) 6 Sheets—Sheet 6.
F. G. DIETERICH.
GRIPPING DEVICE FOR CABLE RAILWAYS.
No. 351,501. Patented Oct. 26, 1886.
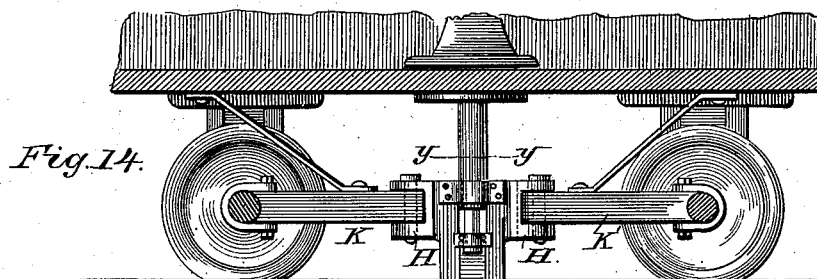
Fig. 14.
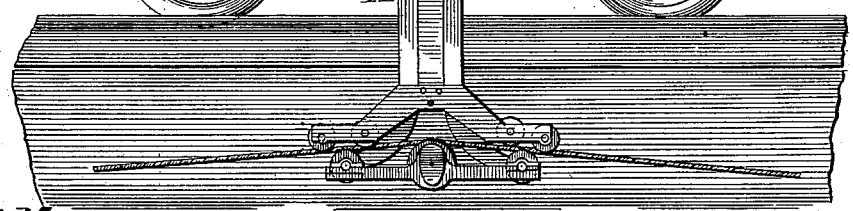
Fig. 15.
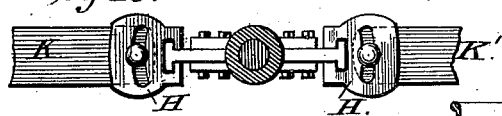
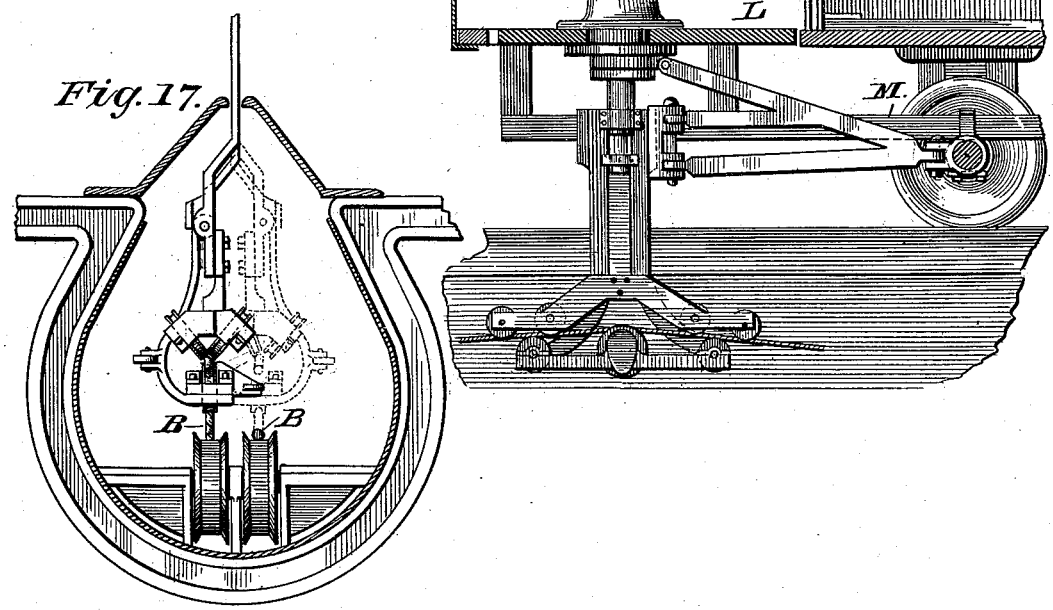
Fig. 16.
Fig. 17.
WITNESSES
INVENTOR
Fred G. Dieterich

UNITED STATES PATENT OFFICE.

FRED G. DIETERICH, OF WASHINGTON, DISTRICT OF COLUMBIA.

GRIPPING DEVICE FOR CABLE RAILWAYS.

SPECIFICATION forming part of Letters Patent No. 351,501, dated October 26, 1886.

Application filed June 24, 1886. Serial No. 206,083. (No model.)

*To all whom it may concern:*

Be it known that I, FRED G. DIETERICH, a citizen of the United States, residing at Washington, District of Columbia, have invented certain new and useful Improvements in Gripping Devices for Cable Railways; and I do hereby declare that the following is a full, clear, and exact description of the invention, which will enable others skilled in the art to which it appertains to make and use the same.

The object of my invention is to provide an improved set of gripping devices for connecting the car to the traveling cable of a cable railway or disconnecting the same therefrom at the will of the operator in a simple, practical, and efficient manner. A leading object arrived at has been to avoid any sacrifice of invested capital by making my improvement applicable to the platforms of the present style of horse-cars with but little alteration of or injury to the same; and in attaining the desired result of practicability and efficiency I have had in the organization of my devices special reference to the avoidance of friction and cramping, which involve a loss of power, and have endeavored to effect a reduction of the wear and tear on the cable and operating parts, whereby an economic use of the cable system may be enjoyed.

Figure 1:
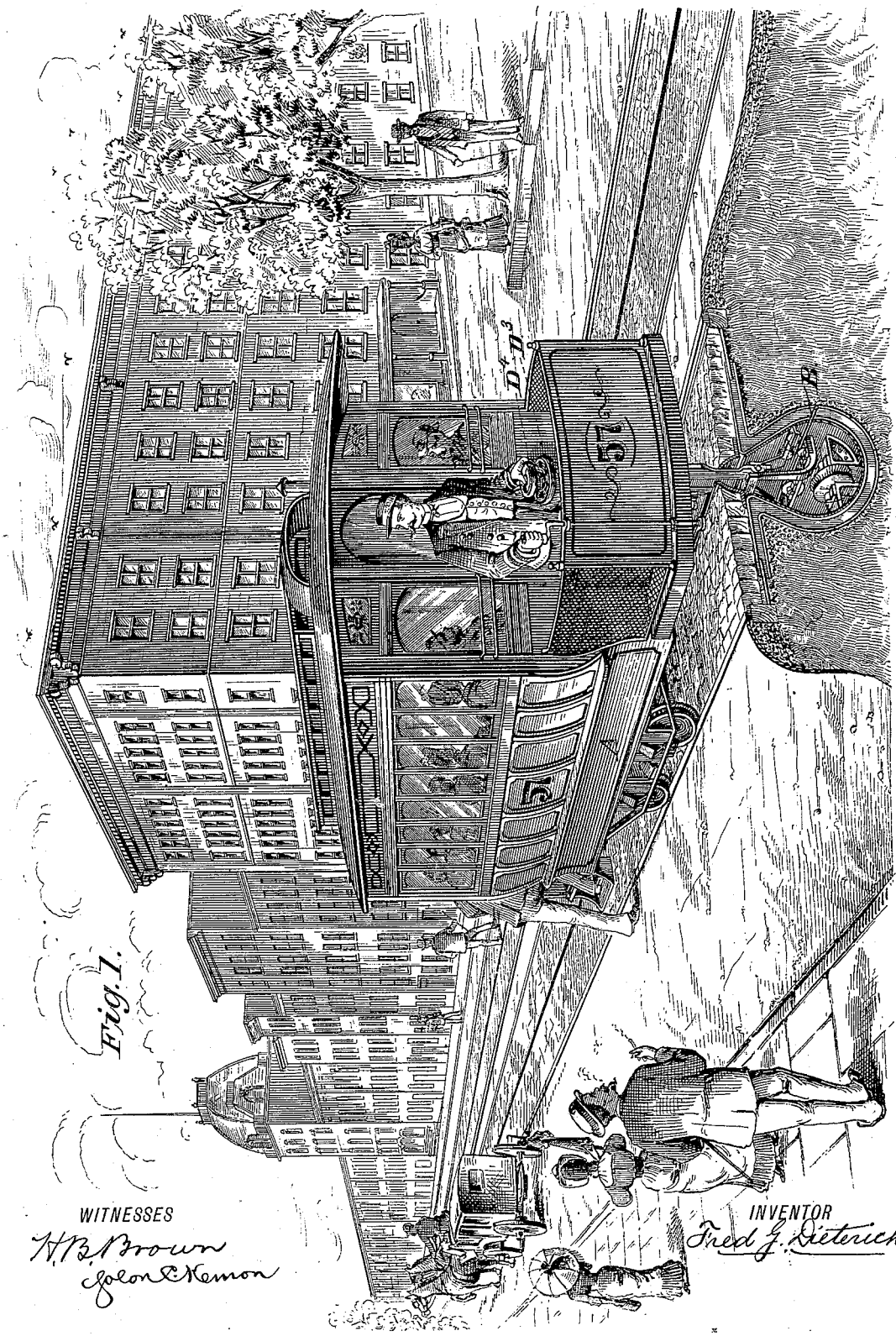
Figure 2:
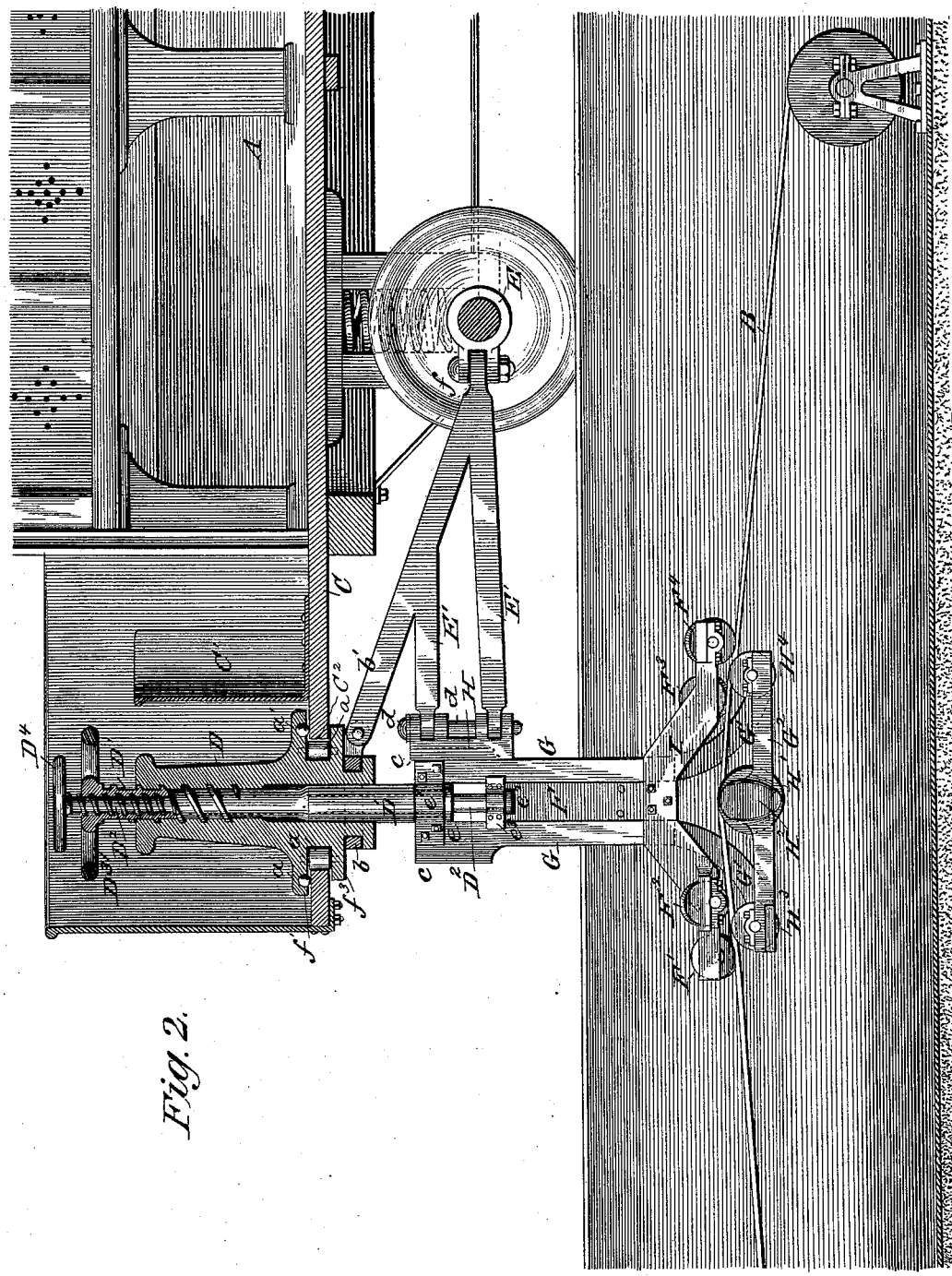
Figure 3:
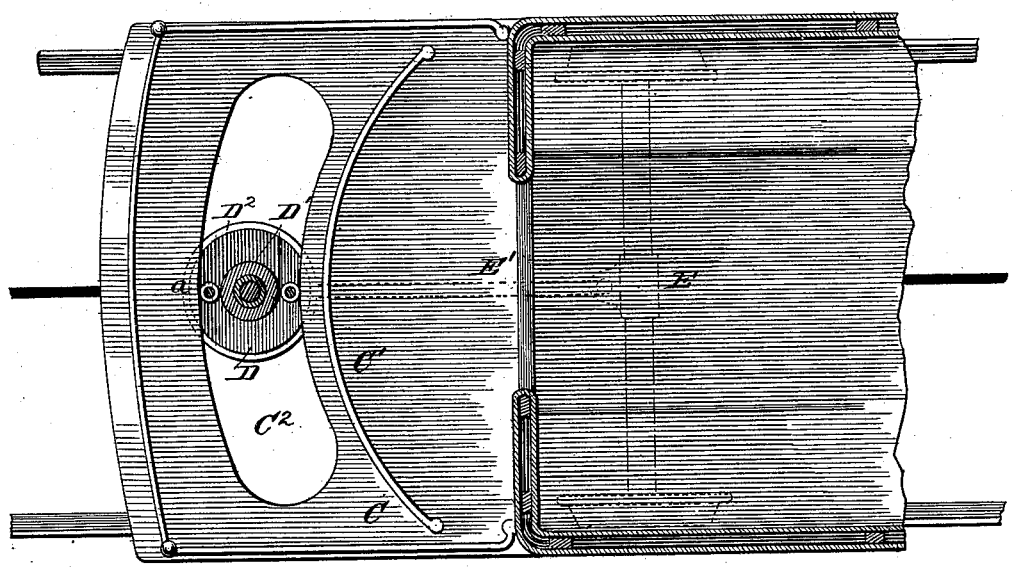
Figure 4:
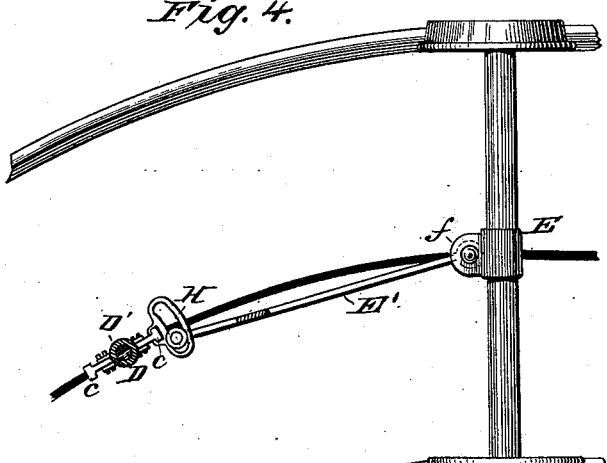
Figure 5:
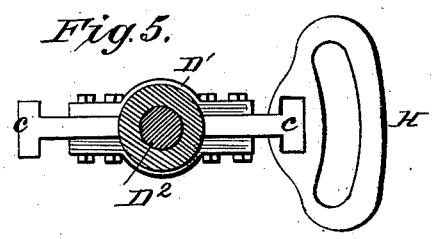
Figure 6:
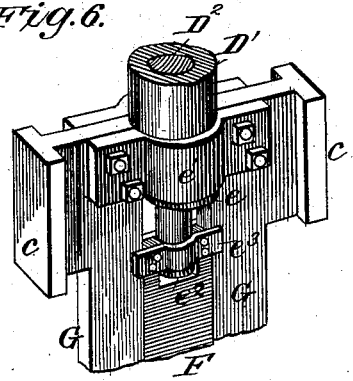

In illustration of my invention I refer to the accompanying drawings, in which Figure 1 is a general perspective view, with the road-bed broken away to expose the cable and its conduit, and showing my invention applied in its proper relation to the cable and the car. Fig. 2 is a vertical longitudinal section through one end of the car, showing my gripping devices in side elevation partly in section. Fig. 3 is a horizontal section of the end of the car, showing the adaptation of its platform to the reception of my gripping devices, a part of which are shown in section. Fig. 4 is a skeleton plan view of the draft-bar and its connection with the gripping devices, illustrating the function of these parts in rounding a curve. Figs. 5 and 6 are respectively a sectional plan and perspective view of the parts of gripping devices with which the draft-bar connects. Fig. 7 is an end elevation of the gripping devices proper, partly in section, showing the gripping devices closed on the cable. Fig. 8 is a similar view showing the gripper open. Fig. 9 is a side view, and Fig. 10 a cross-section through line $x\ x$, Fig. 9, of a part of the gripper. Fig. 11 is a sectional detail of the nose and carrying-pulley of the lower section of the gripper. Figs. 12 and 13 are vertical end elevations of the car, with parts broken away showing the road-bed and conduit in section, with the gripper closed in Fig. 12 and open in Fig. 13. Fig. 14 is a side elevation, partly in section, of a slight modification of my invention as applied to a dummy car between its wheels. Fig. 15 is a horizontal section through the line $y\ y$ of Fig. 14. Fig. 16 is a side elevation, partly in section, of a modification of my invention, in which the gripping devices are mounted upon an independent frame-work and do not partake of the motion of the car. Fig. 17 is a vertical cross-section of a conduit with double cable, showing the application of my reversible gripper to the same.

In the drawings, A represents the ordinary form of street-car, which, as will be seen in Fig. 1, has the usual platform with brake rod and crank at its front end. Upon the platform are arranged the gripping devices, which extend down through the narrow slot in the road-bed into the conduit, where the gripper is made to seize or release the cable B, which latter travels upon pulleys in the bottom of the conduit.

Referring now to Figs. 2 and 3, C represents the ordinary platform, in which I cut or form a curved slot, $C^2$, the curve being the arc of a circle struck from the middle of the front axle. To the middle of this front axle is fastened a collar or sleeve, E, within which the axle rotates, which sleeve is jointed by a short vertical bolt, $f$, the draft-bar E', which extends to and connects with the capstan D, carrying the gripper. This capstan has flanges $f'\ f^3$, which overlap the upper and lower edges of the platform at the curved slot $C^2$. This capstan vibrates in the curved slot as the car turns to the right or left around curves, and to reduce friction anti-friction rollers $a\ a$ are arranged on the capstan between its flanges $f'\ f^3$, so as to bear against edges of the slot, while anti-friction balls or rollers $a'$ rest between the upper flanges and the top of the platform and support the capstan in its movement. The object in making the curved slot in the platform is to permit the gripper to be put on the platform and be secured to the front axle by a draft-bar, and at the same time to allow the gripper sufficient lateral play to compensate for the distance in advance of the wheels of the car in turning curves. When the capstan is in the middle of the curved slot, and the car is traveling in a straight line, the rollers of the capstan bear against the edge of the platform, and a part of the draft-strain of the cable is transmitted to the platform direct; but when the capstan is on outer end of the curved slot in rounding curve it does not fit closely therein, for the reason that the slot is wider at its ends than it is in the middle. This prevents any cramping or binding of the capstan in turning a curve or in regaining its normal position after having turned the curve, there being always sufficient give or yield on the draft device to make the capstan bind if it were not for this provision of widening the ends of the slots. Between this slot and the place where the gripman stands there is erected on the platform a curved guard-rail, C', by which the gripman is prevented from accidentally falling into or having his feet caught in the slot. Within the capstan is arranged the grip-adjusting mechanism. This consists of a sleeve, D', having a hand-wheel, D³, at its upper end, and a concentric inner shaft, D², having a hand-wheel, D⁴, also at its upper end. The sleeve D' has a screw-thread of considerable pitch on its outer periphery, which meshes in a spiral groove in the capstan, and the internal shaft, D², has also a screw-thread meshing into an internal spiral groove of the sleeve, so it will be seen that when the outer sleeve is turned by the hand-wheel both the sleeve and the inner shaft are adjusted together up or down in the capstan; but when the screw-threaded shaft D² is turned it passes down within the sleeve, and is independently adjusted. The lower end of the sleeve D' is grooved and swiveled by its head e in straps e', bolted to the vertical bars G G, attached to the lower section of the gripper, and the lower end of shaft D² is swiveled by its head e² in straps e³, attached to the vertical bar i', guided by straps e³ between the bars G G, and connected to the upper section of the gripper. It will thus be seen that when the sleeve D' is adjusted about its vertical axis the entire gripper is raised or lowered, the great pitch of the thread giving a quick movement, and that when the inner rod-shaft, D², is turned the two parts of the gripper are adjusted in relation to each other.

In connecting the draft-bar to the gripping mechanism said draft-bar has its lower portion, E' E', (which may be in the shape of two bars or one solid piece,) loosely connected to a block, H, by a bolt, d, while an upper brace-section, b', is jointed to a swiveling collar, b, that rests and turns in a groove in the lower portion of the capstan. This section b' braces and strengthens the grip device, distributing the strain to the car, and serves to hold the bolt d vertical. It will be seen that the gripper is capable of an axial motion about its middle or the center of the swivels e' e², and has also an articulate connection at the bolt d in the rear. This permits the greatest freedom from cramping or binding in turning curves, and as the bars G G F of the gripper are of considerable width, and have to adjust themselves in the narrow slot of the conduit, the joint at d is not a centered joint, but the bolt d plays in an elongated slot in block H, (see Figs. 4 and 5,) which slot is formed on the curve of a circle struck from the center or axial line of the gripper-shaft D². This permits the shank-bars G G F of the gripper to adjust themselves to the slot of the conduit without being forced against its edges and cramped by the strain of the draft-bar.

To permit the shank-bars G G of the gripper to rise and fall with the adjustment of the gripper in relation to the non-adjustable draft-bar, said shank bars have at their upper edge flanges or T-shaped sliding surfaces, c c, that move in a correspondingly-shaped groove in the block H. (See Figs. 5 and 6.)

Referring to Fig. 2, it will be seen that the outer shank bars, G G, are attached to the lower section, G², of the gripper, and the inner shank-bar, F, is attached to the upper section, I, of the gripper. The motion which the bar F and the gripper-section I has with relation to the bars G G and the lower section of the gripper is somewhat peculiar, and is illustrated in detail in Figs. 7 to 11. To the side bars, G G, are jointed at i', the two arms G' G', which are hook-shaped and connected below by the horizontal cross-bar G², forming the lower gripper-section. It will be seen, therefore, that the lower gripper-section has a laterally-swinging adjustment about a horizontal axis in passing beneath and from under the cable. The slide-bar F, which, as seen in Fig. 2, is attached to the upper gripper-section, carries on the side opposite plate I a cross-head having offsetting-wings $f^2 f^2$, Figs. 9 and 10, which overlap the upper ends of the laterally-swinging bars G' G' of the lower gripper section. Between the bars G' G' and the lower extensions, g g, of the side bars, G G, are interposed one or more spiral springs, $g' g^2$, which tend to force the lower gripper-section away from the cable. Inside of one of these springs is arranged a headed stud, h, which is affixed at one end to the extension g of bar G, and projects through a hole in the bar G' and terminates in a head outside of the hole, which limits the outward movement of the bars G' when projected outwardly by the springs. I have here shown two springs for each bar G'; but only one is required until it requires supplementing by weakness produced by long use. Now when the bar F is in its elevated position, as in Fig. 8, it will be seen that the springs $g' g^2$ throw the bars G' away from the cable and hold the gripper open; but when the bar F is forced downward it will be seen that its wings or cross-head $f^2 f^2$ pass down upon and bear against the upper ends of the bars G' G' and press them inwardly against the tension of the springs, forcing the lower gripper-section under the cable, as in Fig. 7. To facilitate this movement and render it as free from friction as possible, anti-friction rollers are arranged on the inner faces of the wings $f^2$, where they come in contact with the bars G'. It being borne in mind that the bar F is attached to the plate I, bearing the upper gripper-section, it will be seen that the same movement of the bar F downwardly to swing the lower gripper-section into position and catch the cable also carries the upper gripper-section down to bearing contact with the cable, as shown in dotted lines in Fig. 7, this bearing contact, however, being effected by the last portion of the movement, so that the cable may be caught and the gripper then, by a further downward adjustment of bar F, may be made to gradually take hold of the cable and slowly start the car without a sudden jerk.

At the lower end of the swinging bar G' and on the cross-bar $G^2$ is formed a nose, $H^2$, whose function is to press under and lift the cable onto the pulleys $H^3$ H' $H^4$. This nose is provided with anti-friction rollers $k'$, set upon a vertical axis to relieve friction against the cable-supporting pulleys, and has a roller, $k$, set upon its inclined surface, which, when the cable is rising on the nose, allows the cable to move across the nose with less friction and also assists the cable in riding up onto the pulleys. An anti-friction roller, $k^2$, is also placed at the back of each bar G' to prevent destructive contact of the gripper against the side of the conduit.

It will be observed that the middle one, H', of the pulleys of the lower gripper-section is of much larger diameter than the other. The object of this is to bring the cable into gradual bearing with the gripper in closing, and also to make a large carrying-pulley out of the same to allow the cable to pass freely over when the car is stopped, so that in stopping the car it is only necessary to lift the upper gripper-section to a height sufficient to release the cable from the outer gripper-pulleys without raising bar F high enough to allow the bars G' to swing the pulleys from beneath. In this case the large diameter of middle pulley, H', allows the cable to pass easily and with little friction over its surface, and when the car is ready to start again only a slight motion of the hand-wheel is required to bring the gripper into close contact with the cable again.

The upper gripper-section consists of the plate I, attached to bar F, and four pulleys, F' $F^2$ $F^3$ $F^4$—two on each end. The pair of pulleys $F^3$ $F^4$ at one end are upon opposite sides of pulley $H^4$ of the lower gripper-section, and the pair F' $F^2$ at the other end are upon opposite sides of the pulley $H^3$ of the lower section, and when the gripper is closed upon the cable they seize it and bend it to a slight zigzag or wavy line between them that gives a firm hold. The pairs of pulleys at one end of the upper gripper-section are not in vertical planes, but are set diagonally and at a reverse inclination to each other, to get a better hold on the cable and render it less liable to slip from position. One pulley of each pair F' $F^2$ and $F^3$ $F^4$ is set at a lower level than the other. Thus in Fig. 8 it will be seen that F' is lower than $F^2$, and the pulley which is lowest at one end of the gripper is upon the opposite side of the cable from the pulley which is lowest at the other end of the gripper. The object of this is to avoid bringing all of the upper pulleys in contact with the cable at once, thus permitting the cable to be gradually seized by the pulleys as the gripper closes, the lowest pulleys binding against the cable first, but still allowing the cable to slip through until, finally, as the gripper closes tightly, the other pulley comes also into binding-contact, and makes a positive connection of the car. This prevents the cable and cars from being jerked by a too sudden connection, and avoids discomfort to the passengers, and also much injurious wear and strain on the cable.

In arranging the shank-bars G G to slide vertically on the block H, it will be seen by reference to Figs. 5 and 6, that I form the T-shaped flanges $c$ on both the front and rear bar, G. The object of this is to adapt the gripper devices to the reversal which is required in transferring them from one cable to another running beside it. Thus, as in Fig. 17, if the gripper devices are co-operating with the left-hand cable, and it gets out of order, the reversible construction (shown in Fig. 6) permits the whole gripper to be turned round and slid into the draft-block H, in which position the gripper is then adapted to co-operate with the right-hand cable in Fig. 17, as shown by the dotted lines.

In operating my invention, to connect the car to the cable the whole gripper is lowered by turning down the screw-sleeve D' by hand-wheel $D^3$, the gripper being opened by the elevation of the screw-shaft $D^2$, by its hand-wheel $D^4$, as shown in Fig. 13. The screw-shaft $D^2$ is then turned downwardly by its hand-wheel, which causes the laterally-swinging lower gripper-section to be forced under the cable, lifting the same into the pulleys of the lower gripper-section, and as the screw-shaft $D^2$ passes farther down it carries the upper gripper-section into gradual contact with the cable, and gradually increases the friction on the same until the cable starts the car, moving it slowly at first, and gradually faster until both travel at the same speed. The entire gripping devices are then lifted by raising the threaded sleeve D', through hand-wheel $D^3$, so as to lift the gripper away from contact with the supporting-pulleys, as shown in Fig. 12.

As so far described, my invention has been designed to be applied to the platform of the ordinary cars. It is applicable, however, in most of its features, to dummy cars to which the passenger-car is attached. An example of such application is shown in Fig. 14, in which the gripper is placed between the two wheels, and is connected to the two axles of these wheels by a jointed bar, K, in front, and another one, K', in the rear.

In Fig. 16 I also show another modification in which the gripper, instead of being mounted upon a platform attached to the car, is mounted upon an independent platform, L, carried by a frame-work, M, mounted upon the axles. By this arrangement the platform and gripper do not partake of the spring-seated up-and-down motion of the car on its springs, but maintain a more constant position in relation to the conduit.

Having thus described my invention, what I desire to claim, and secure by Letters Patent, is—

1. A street car having a curved slot in its front platform, in combination with a draft-bar connected to the front axle, and gripping devices fastened to the draft-bar and arranged to oscillate in said slot in the platform, substantially as shown and described.

2. A street-car having a curved slot in its front platform, and a guard-rail, C', beside it, in combination with a draft-bar connected to the front axle, and gripping devices connected to the draft-bar and arranged to oscillate in said slot, substantially as and for the purpose set forth.

3. The laterally-adjustable capstan having gripping devices working centrally through the same, in combination with the car having a slot in its platform in which said capstan is guided, and draft-connections, substantially as shown and described.

4. The combination of the internally and externally threaded sleeve D', the concentric threaded shaft D², the internally-threaded and laterally-adjustable capstan, the shank-bars G G, carrying lower gripper-section and swiveled to the sleeve D', and the shank-bar F, carrying upper gripper-section and swiveled to the central screw-shaft, substantially as and for the purpose described.

5. The concentric screw-shaft and screw-sleeve, combined with the capstan and swiveled below, the one to the connections of the upper gripper-section and the other to the lower gripper-section, substantially as and for the purpose set forth.

6. The combination, with the capstan and the vertically-adjustable gripper mechanism, of a draft-bar connected to the axle of the car and jointed to both the capstan and gripper mechanism, substantially as shown and described.

7. The combination, with a gripper mechanism swiveling about a central vertical axis, of a draft-bar loosely connected to the same in rear of said vertical axis, substantially as shown and described.

8. The combination, with a gripper mechanism swiveling about a vertical central axis, of a draft-bar and a coupling-block connected loosely to the draft-bar by a vertical bolt and having a vertically-sliding connection with the gripping devices, substantially as and for the purpose set forth.

9. The coupling-block H, having an elongated horizontal slot, in combination with the bolt d, playing laterally therein, the draft-bar connected to said bolt, and the gripping devices having a vertical sliding adjustment in said block, substantially as shown and described.

10. The reversible gripper, swiveling about a vertical central axis and having the T-shaped flange c on both its front and rear edges, in combination with the grooved draft-block and draft-bar, as and for the purpose set forth and described.

11. The combination, with the laterally-swinging gripper-section, of the vertically-adjustable upper gripper-section and a single adjusting-bar operating upon them both successively by a single movement, substantially as described.

12. The combination, with the laterally-swinging lower gripper-section, of the vertically-adjustable upper gripper-section and a vertically-adjustable bar, F, connected directly to the upper gripper-section, and having bearing-surfaces adapted to strike and deflect the supports of the lower gripper-section, substantially as and for the purpose described.

13. The combination, with the bars G G, of the laterally-swinging bars G' G', carrying the lower gripper-section, one or more springs for holding the lower gripper-section away from the cable, and a vertically-adjustable bar, F, connected to the upper gripper-section, and provided with wings or bearing-surfaces $f^2 f^2$, adapted to bear against and deflect the bars of the lower gripper-section, as and for the purpose described.

14. The combination, with the bars G, having extension g, of the laterally-swinging bars G', hinged above the extension g and carrying the lower gripper-section, the spring g', and the headed stop-bolt h, as and for the purpose herein described.

15. The combination, with an upper gripper-section, of a laterally-adjustable lower gripper-section, having a central carrying-pulley for the cable, and a pointed and inclined nose for lifting the cable, extending up to the periphery of the carrying-pulley, substantially as and for the purpose described.

16. The combination, with an upper gripper-section, of a laterally-adjustable lower gripper-section having a pointed and inclined nose, with a roller, k, arranged upon its inclined surface, as and for the purpose described.

17. The combination, with an upper gripper-section, of a laterally-adjustable lower gripper-section, having a roller, k', set about a vertical axis at the point of the nose, substantially as shown and described.

18. The lower gripper-section, having small grip-pulleys at its ends and a middle pulley of large diameter arranged to act alternately as a grip-pulley and as a carrying and supporting pulley for the cable when the car is starting, substantially as shown and described.

19. A cable-gripper consisting of two sections or jaws, the lower section having vertically-set pulleys, and the upper section obliquely-set pulleys, arranged upon opposite sides of the vertical pulleys of the lower section, as and for the purpose described.

20. A cable-gripper consisting of two sections or jaws, made adjustable from each other, the upper section being provided with pulleys that are arranged at different levels to come successively into bearing-contact with the cable to gradually start the car, substantially as shown and described.

21. The combination, with the capstan and gripper, as described, of the bars K and K', jointed, respectively, to the front and rear axles, and the coupling-blocks H H, loosely connected to said bars and having a vertically-sliding connection with the grippers, substantially as shown and described.

22. The platform L, slotted as described, and disconnected from the car, in combination with the capstan and gripping mechanism playing therein, and the draft-bar connecting the same to the axle of the car, substantially as and for the purpose described.

FRED G. DIETERICH.

Witnesses:
SOLON C. KEMON,
H. B. BROWN.